No. 621,045. Patented Mar. 14, 1899.
F. A. DIXON.
WASHING AND CANNING TABLE.
(Application filed Mar. 19, 1897.)

(No Model.)

Witnesses,
Inventor,
Frank A. Dixon
By Dewey & Co.
Atty

UNITED STATES PATENT OFFICE.

FRANK A. DIXON, OF SAN JOSÉ, CALIFORNIA.

WASHING AND CANNING TABLE.

SPECIFICATION forming part of Letters Patent No. 621,045, dated March 14, 1899.

Application filed March 19, 1897. Serial No. 628,356. (No model.)

*To all whom it may concern:*

Be it known that I, FRANK A. DIXON, a citizen of the United States, residing at San José, county of Santa Clara, State of California, have invented an Improvement in Washing and Canning Tables; and I hereby declare the following to be a full, clear, and exact description of the same.

My invention relates to a device for the rapid washing and canning of fruit and other similar substances which are to be put up and hermetically sealed.

It consists, essentially, of an extended trough having tilting screen-bottomed trays fitted therein adapted to receive the fruit to be washed and afterward to be tilted up to lift the fruit out of the water and place it in convenient position to be put into the cans.

It also consists in details of construction which will be more fully explained by reference to the accompanying drawings, in which—

Figure 1:
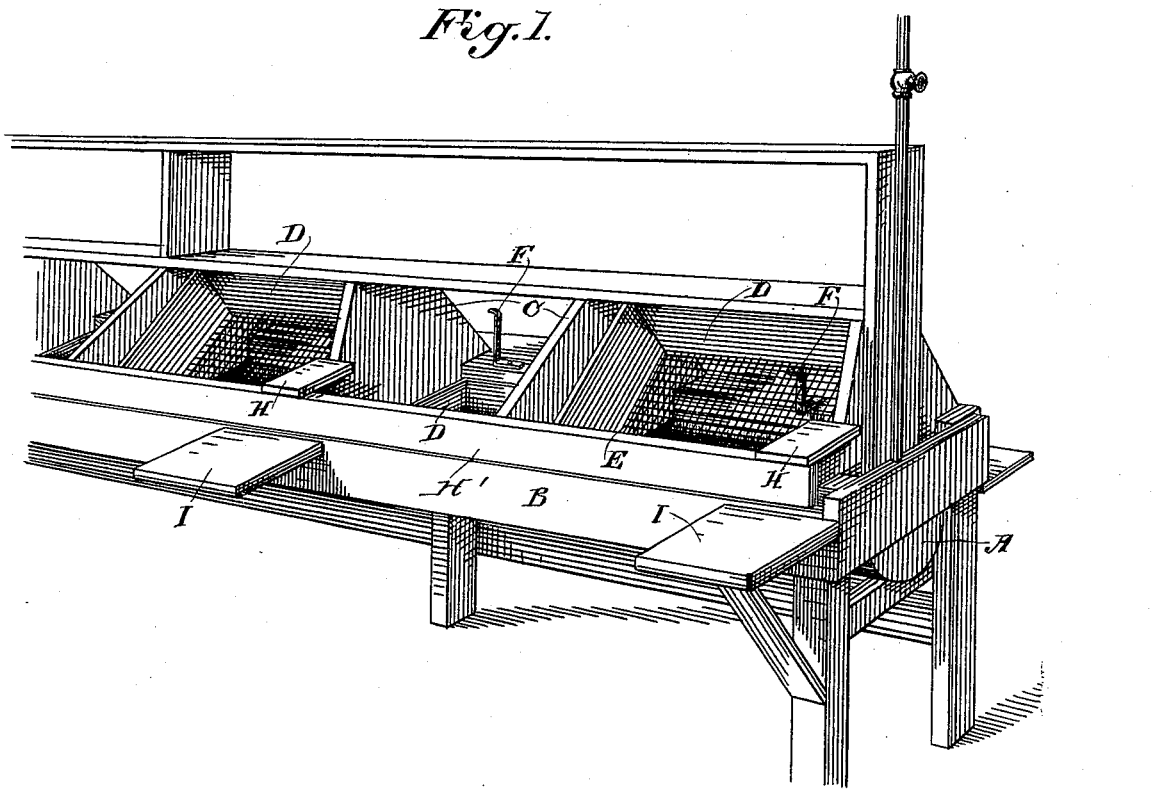
Figure 2:
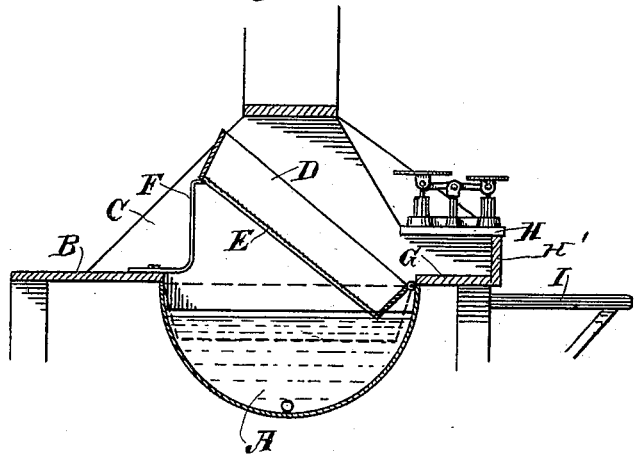

Figure 1 is a view of my apparatus. Fig. 2 is a cross-section of the same.

In the canning of fruit it is desirable to first wash the fruit before placing it in the cans and immediately remove it to prevent soaking and discoloration; but it is difficult for the operator to remove and drain it and place it in the cans. It necessitates the constant dipping of the hands in the water, and experience has shown that the operators soon become ill and unfit for work under these conditions.

In my invention I have shown a trough A, of any suitable or desired length and shape, preferably of a concaved form. This trough is fixed in a table or framework B, of any suitable or desired length, having regulated spaces for the operators, so that as many may work at one time as the length of the apparatus will admit. These spaces are preferably separated by vertical partitions C, extending a short distance downward below the upper rail of the table B, and within each of these spaces is pivoted or journaled a tray D, having a screen-bottom, as shown at E. These trays are arranged to tilt about the fulcrum-points, and when tilted upward are supported by stops F, which are suitably placed, preferably at the back of the table and opposite the positions of the operators. The backs of these trays are sufficiently high, so that when the trays are turned up and rest upon the stops it will be impossible to put any fruit into them, and this prevents any accidental deposit of fruit in the washing-tanks, because the trays when in this position will obstruct the opening.

When the boys who supply the fruit bring it to the table, they disengage the stops, allow the trays to fall, so that the bottoms of the trays will be submerged in the water, which is constantly supplied to the trough and withdrawn by suitable supply and discharge pipes. The fruit is dumped into the tray, falling upon the screen-bottom, and the one bringing it will give it a few movements, so as to agitate the fruit in the water and wash it, and will then tilt the tray up, allowing it to rest upon the stop F, proceeding thus to each of the trays as fast as they need a supply. When the trays are thus turned up, the water rapidly drains off, the bottom standing at an incline and facing the one who fills the cans, who is seated at the opposite side of the table. This allows them to conveniently and rapidly handle the fruit, which is also drained, so that the operators do not have to immerse their hands into the water.

Within the rail B of the table is a shelf G, suitably disposed to receive the cans, so that they may be easily filled by the operator. At one side of each subdivision is a small shelf H for scales, upon which the cans may be placed, so that each can receives the desired weight of fruit. A vertical wall H', extending along one side of the table, connects the series of shelves H with the shelf G and assists in preventing the displacements of the cans as said shelf G. The cans after being filled are then removed and placed upon a shelf I, exterior to the table, ready for removal. By this construction the fruit is rapidly washed and lifted out of the water, so as to be drained, at the same time being placed in a convenient position at an incline facing the can-fillers, so that it can be readily handled. The trays projecting rearwardly, so as to be filled from behind, prevent any interruption or disturbance of the operators by those going around to supply the fruit to the trays, and by the peculiar construction of the trays and the table fruit cannot be dumped into the trough when the trays are in their elevated position.

Having thus described my invention, what I claim as new, and desire to secure by Letters Patent, is—

An apparatus for washing and canning fruit consisting of an extended framework divided into separate working spaces, and having a continuous tank within and beneath it, said framework having a horizontal shelf G and vertical wall rising therefrom, a shallow tray for each compartment of the frame, having a foraminous bottom and having the upper edge of its front side hinged substantially in line with said shelf whereby when the tray is raised its front wall is substantially continuous with said shelf, and a stop for supporting the rear end of the tray when the latter is lifted out of the water.

In witness whereof I have hereunto set my hand.

FRANK A. DIXON.

Witnesses:
S. H. NOURSE,
JESSIE C. BRODIE.